(12) United States Patent
Nam et al.

(10) Patent No.: US 10,222,888 B2
(45) Date of Patent: Mar. 5, 2019

(54) MIRROR DISPLAY

(71) Applicant: LG Display Co., Ltd., Seoul (KR)

(72) Inventors: Sangjin Nam, Cheonan-si (KR);
Kyujin Kim, Goyang-si (KR);
Seungjin Yoo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 15/605,742

(22) Filed: May 25, 2017

(65) Prior Publication Data

US 2017/0344166 A1 Nov. 30, 2017

(30) Foreign Application Priority Data

May 30, 2016 (KR) .................. 10-2016-0066431

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/13471* (2013.01); *G02F 1/133536* (2013.01); *G02F 1/134309* (2013.01); *G02F 1/136286* (2013.01); *G06F 3/044* (2013.01); *G06F 3/0416* (2013.01); *G09G 3/3614* (2013.01); *G02F 2001/133567* (2013.01); *G02F 2203/02* (2013.01); *G02F 2203/66* (2013.01); *G09G 2300/0426* (2013.01)

(58) Field of Classification Search
CPC ...... G06F 3/044; G06F 3/0412; G06F 3/0416; G06F 2203/04103; G02F 1/13338
See application file for complete search history.

(56) References Cited

U.S. PATENT DOCUMENTS 6,646,697 B1 * 11/2003 Sekiguchi ........... G02F 1/13471
349/73
6,958,796 B2 * 10/2005 Takizawa .......... G02F 1/133553
349/106
(Continued)

FOREIGN PATENT DOCUMENTS

EP 0933663 A1 8/1999
EP 2837967 A2 2/2015
(Continued)

OTHER PUBLICATIONS

European Extended Search Report, European Application No. 17173454.4, dated Oct. 19, 2017, 5 pages.

*Primary Examiner* — Koosha Sharifi-Tafreshi
(74) *Attorney, Agent, or Firm* — Fenwick & West LLP

(57) ABSTRACT

A mirror display is described. The mirror display includes a plurality of first electrodes disposed on a first substrate, a plurality of sensor lines disposed on the first substrate, the plurality of sensor lines connected to the plurality of first electrodes, a plurality of second electrodes disposed on a second substrate, the plurality of second electrodes facing the first substrate, a liquid crystal layer interposed between the plurality of first electrodes and the plurality of second electrodes, a plurality of mirror driving lines on the second substrate, the plurality of mirror driving lines connected to the plurality of second electrodes, and a reflective polarizing film attached to the second substrate.

19 Claims, 20 Drawing Sheets

(51) Int. Cl.
  *G02F 1/1335*    (2006.01)
  *G02F 1/1343*    (2006.01)
  *G02F 1/1362*    (2006.01)
  *G06F 3/044*     (2006.01)
  *G09G 3/36*      (2006.01)
  *G02F 1/1347*    (2006.01)

(56) References Cited

U.S. PATENT DOCUMENTS

| | | | |
|---|---|---|---|
| 7,057,681 B2 * | 6/2006 | Hinata | G02F 1/133528 |
| | | | 349/113 |
| 7,088,406 B2 * | 8/2006 | Yun | G02F 1/133512 |
| | | | 349/113 |
| 7,495,719 B2 * | 2/2009 | Adachi | G02F 1/133536 |
| | | | 349/74 |
| 9,024,913 B1 | 5/2015 | Jung et al. | |
| 2004/0196420 A1 * | 10/2004 | Wu | H01L 51/5271 |
| | | | 349/114 |
| 2004/0201796 A1 * | 10/2004 | Yun | G02F 1/133512 |
| | | | 349/96 |
| 2011/0019133 A1 * | 1/2011 | Ko | G02F 1/133528 |
| | | | 349/96 |
| 2016/0349875 A1 * | 12/2016 | Weng | G06F 3/044 |

FOREIGN PATENT DOCUMENTS

KR     10-0789866 B1     12/2007
KR     10-2012-0074499 A1     7/2012

* cited by examiner

[Display driving]

[Multi driving]

[Mirror driving]

MIRROR DISPLAY

CROSS-REFERENCE TO RELATED APPLICATIONS

This application claims the priority benefit of Korean Patent Application No. 10-2016-0066431 filed on May 30, 2016, which is incorporated by reference in its entirety.

BACKGROUND

Field of Technology

The present disclosure relates to a mirror display which is driven in a display mode and a mirror mode and is capable of sensing a touch input.

Discussion of the Related Art

Recently, display devices for various purposes have been developed. A mirror display has a mirror coupled to a display. Mirror displays are expanding applications such as room mirrors in automobiles and mirrors in clothing stores.

An example of a mirror display is implemented by a method of assembling a reflector 8 and a display 4, 6 in a set frame 2 as shown in FIG. 1. The display may be implemented by a liquid crystal display (LCD) including a display panel 4 and a backlight unit (BLU) 6. The reflector 8 is a mirror region for reflecting light. This mirror display cannot change a mirror region MR and a display region DR because the mirror region MR and the display region DR are physically separated.

In the conventional mirror display, an in-cell touch sensor cannot be applied to the mirror region and the display region. In order to implement a touch screen on such a mirror display, a separate touch panel must be bonded to the mirror display.

In-cell touch sensor technology senses a touch input using a touch sensor embedded in a pixel array of a display. The in-cell touch sensor technology can implement a touch screen without increasing a thickness of the display. However, since pixels and touch sensors must be time-divisionally driven, the driving method is limited. In a display with an in-cell touch sensor, in order to prevent mutual influence due to coupling between the pixel and the touch sensor, one frame period is divided into a display period in which the pixels are driven and a touch sensing period in which the touch sensors are driven. Therefore, the in-cell touch driving method is difficult to increase a touch sensing sensitivity because the display period is short and the touch sensing period is short.

SUMMARY

The embodiments herein describe a mirror display capable of varying a mirror region and a display region, reducing optical interference between the mirror region and the display region, and sensing a touch input using an in-cell touch sensor.

In one embodiment, there is provided a mirror display including a mirror panel including: a first substrate; a plurality of first electrodes on the first substrate; a plurality of sensor lines on the first substrate, the plurality of sensor lines connected to the plurality of first electrodes; a second substrate; a plurality of second electrodes on the second substrate, the plurality of second electrodes facing the first substrate; a liquid crystal layer interposed between the plurality of first electrodes and the plurality of second electrodes, a plurality of mirror driving lines on the second substrate, the plurality of mirror driving lines connected to the plurality of second electrodes; and a reflective polarizing film attached to the second substrate; a mirror panel driver configured to apply a sensor driving signal to the plurality of first electrodes through the plurality of sensor lines to sense a touch on the mirror panel, and apply a mirror driving signal to the plurality of second electrodes, the mirror driving signal selecting either a mirror mode or a display mode of the mirror panel, a display panel on the mirror panel, the display panel configured to display an input image; and a display panel driver configured to write data of the input image to pixels of the display panel.

The plurality of first electrodes and the plurality of second electrodes of the mirror panel may be divided into a plurality of blocks having a predetermined size.

The mirror driving signal of the mirror mode is applied to a first set of second electrodes from the plurality of second electrodes that is included in a first block and drives the first set of second electrodes in the mirror mode, and the mirror driving signal of the display mode is applied to a second set of second electrodes from the plurality of second electrodes that is included in a second block and drives the second set of second electrodes in the display mode while the first set of second electrodes is driven in the mirror mode.

In one embodiment, there is provided a mirror display panel including a first substrate; a plurality of first electrodes on the first substrate; a plurality of sensor lines on the first substrate, the plurality of sensor lines connected to the plurality of first electrodes; a second substrate; a plurality of second electrodes on the second substrate, the plurality of second electrodes facing the first substrate; a liquid crystal layer interposed between the plurality of first electrodes and the plurality of second electrodes; a plurality of mirror driving lines on the second substrate, the plurality of mirror driving lines connected to the plurality of second electrodes, and a reflective polarizing film attached to the second substrate.

In one embodiment, a mirror display panel comprises: a first substrate; a plurality of first electrodes on the first substrate; a second substrate; a plurality of second electrodes on the second substrate that face the first substrate, the plurality of second electrodes comprising a first set of second electrodes and a second set of second electrodes; a liquid crystal layer interposed between the plurality of first electrodes and the plurality of second electrodes; and a plurality of mirror driving lines on the second substrate, the plurality of mirror driving lines comprising a first set of mirror driving lines and a second set of mirror driving lines, the first set of mirror driving lines connected to the first set of second electrodes, and the second set of mirror driving lines connected to the second set of second electrodes; wherein the first set of second electrodes reflect external light incident on the first set of second electrodes responsive to the first set of second electrodes receiving a mirror driving signal in a mirror mode via the first set of mirror driving lines, and wherein the second set of second electrodes passes light received from a display panel that is on the mirror display panel while the first set of second electrodes reflects external light responsive to the second set of second electrodes receiving the mirror driving signal in a display mode via the second set of mirror driving lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in example embodiments of the invention, of which are illustrated in the accompanying drawings. Wherever possible, the same reference numbers will be used throughout the drawings to refer to the same or like parts. It will be paid attention that detailed description of known arts will be omitted.

A display panel of a mirror display may be implemented based on a flat panel display device such as a liquid crystal display (LCD), and an organic light emitting display (OLED). In the following embodiments, the liquid crystal display will be mainly described, but the invention is not limited thereto. For example, the display panel described in the following embodiments is exemplified as a display panel of the liquid crystal display device, but may be replaced with a display panel of another flat panel display device such as the OLED display device.

An in-cell touch sensor can be implemented as a capacitive type touch sensor, for example, a mutual capacitance sensor or a self capacitance sensor, that can be embedded in a pixel array. Hereinafter, the touch sensor will be described with reference to the self capacitance sensor, but the embodiments herein are not limited thereto.

Figure 1:
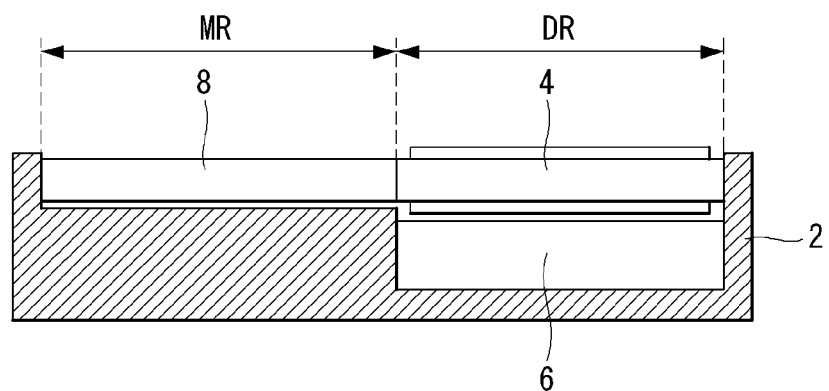
FIG. 1 illustrates an example of a conventional mirror display.
Figure 2:
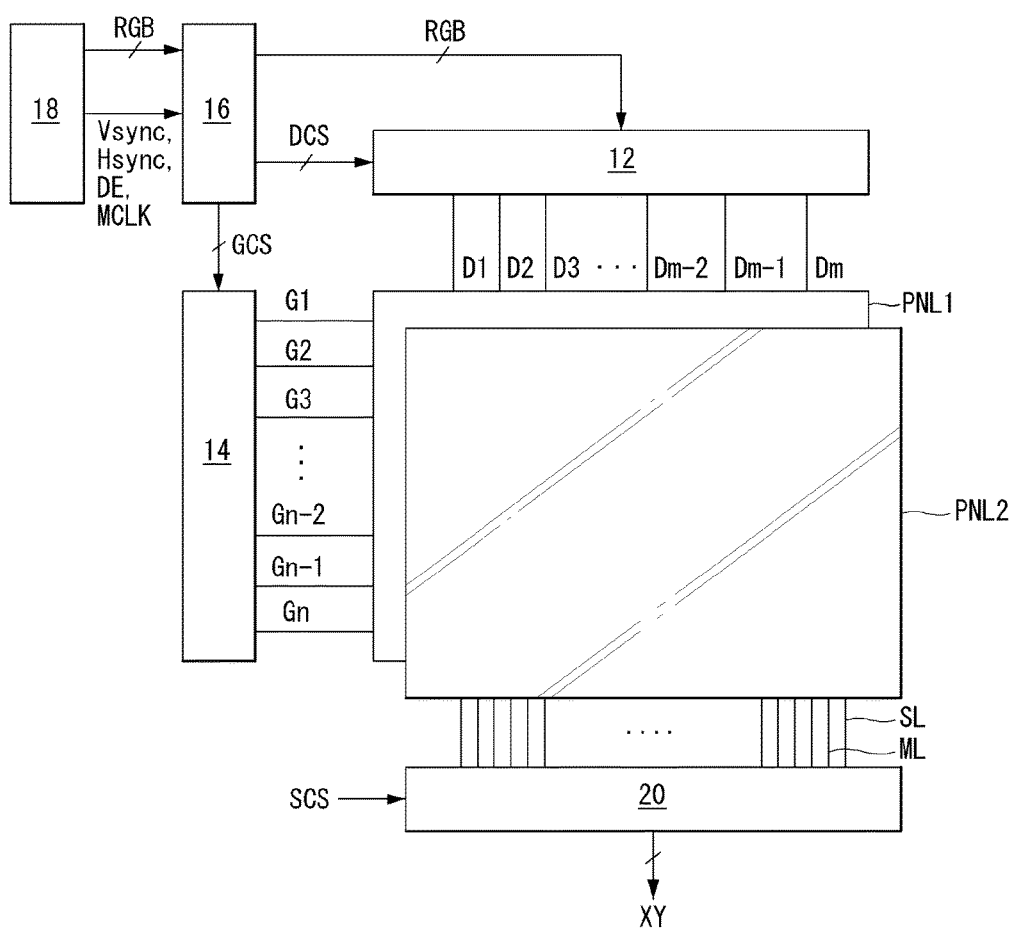
FIG. 2 is a block diagram illustrating a mirror display according to one embodiment.
Figure 3:
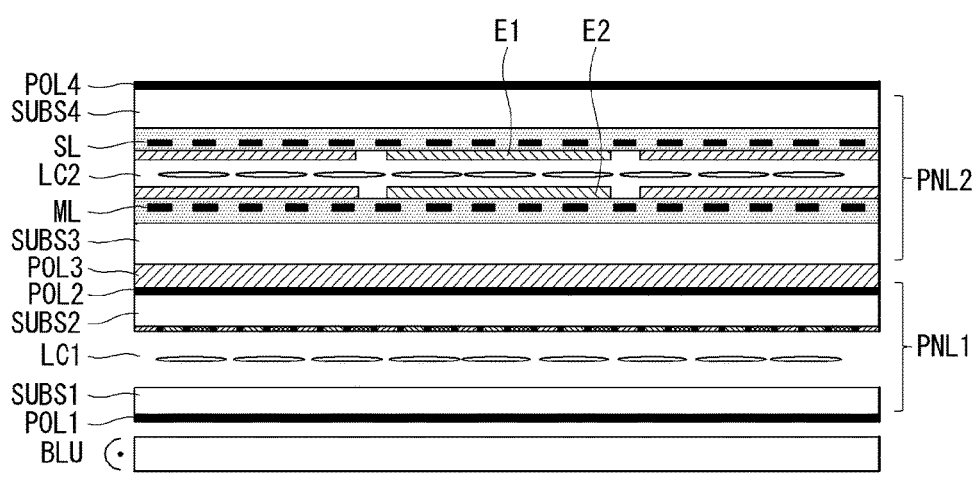
FIG. 3 is a cross-sectional view illustrating a cross-sectional structure of a display panel and a mirror panel shown in FIG. 2 according to one embodiment.
Figure 4:
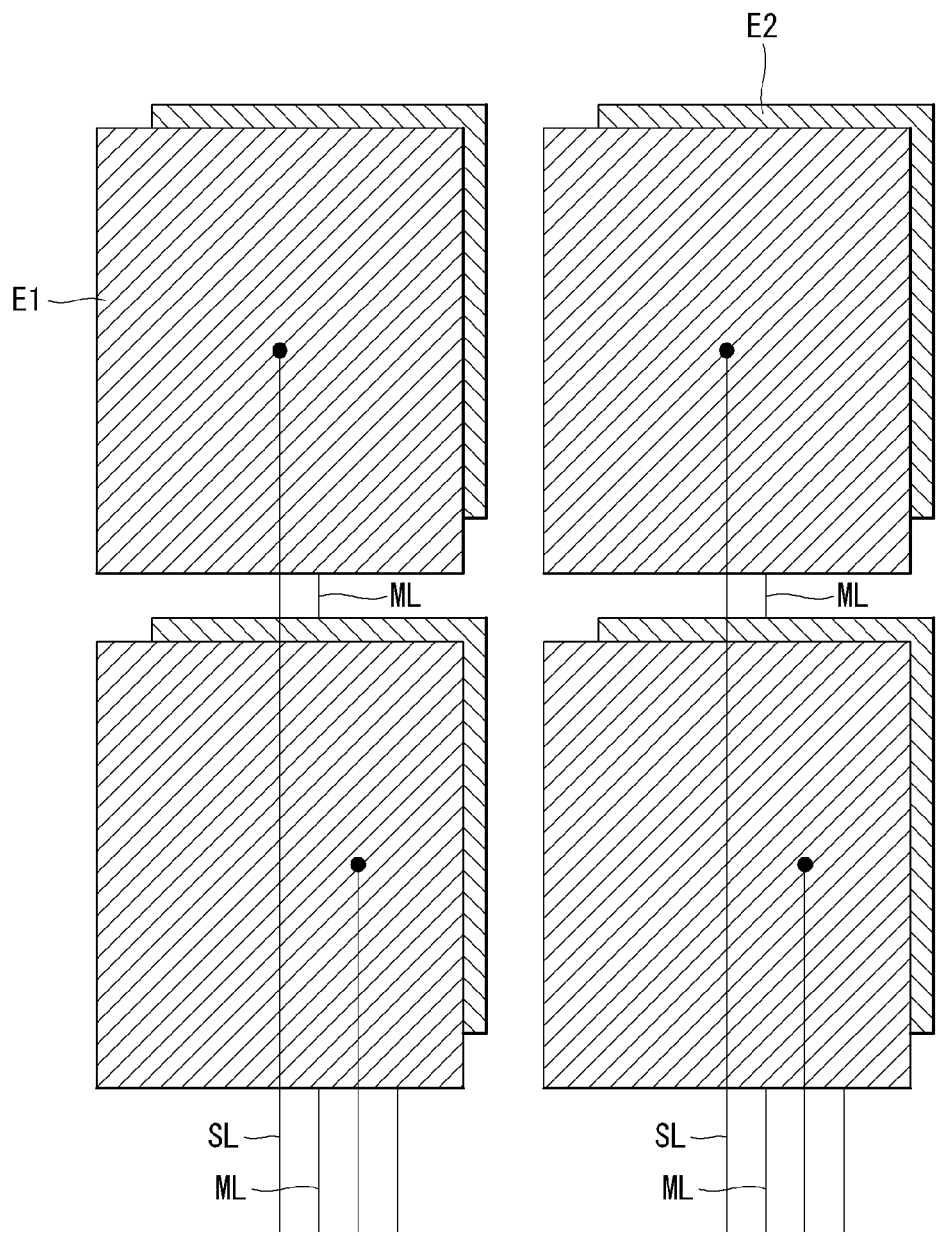
FIG. 4 is a plan view schematically illustrating electrodes and lines of a mirror panel according to one embodiment.

Referring to FIGS. 2 to 4, one embodiment of a mirror display includes a display panel PNL1, display panel drivers, a mirror panel PNL2, a mirror panel driver 20, and the like.

The display panel PNL1 includes a pixel array in which an input image is reproduced. The pixel array includes m×n pixels arranged in a matrix defined by data lines D1 to Dm and gate lines G1 to Gn. The display panel PNL1 includes a lower substrate SUBS1 and an upper substrate SUBS2 which are adhered by a sealant material not shown with a liquid crystal layer LC1 interposed therebetween.

A TFT array may be disposed on the lower substrate SUBS1 of the display panel PNL1. The TFT array includes thin film transistors (TFTs) formed at intersections of the data lines D1 to Dm and the gate lines G1 to Gn, a pixel electrode for charging a data voltage, a common electrode for applying a common voltage Vcom, a storage capacitor Cst connected to the pixel electrode for maintaining the data voltage, and the like.

A color filter array may be disposed on the upper substrate SUBS2 of the display panel PNL1. The color filter array includes a black matrix (BM) and a color filter.

In a display panel PNL1 of a color filter on TFT (COT) structure, the black matrix and the color filters may be disposed on the TFT array. In an instance of a vertical electric field driving method such as a Twisted Nematic (TN) mode and a Vertical Alignment (VA) mode, the common electrode may be formed on the upper substrate. In an instance of a horizontal electric field driving method such as an In-Plane Switching (IPS) mode and a Fringe Field Switching (FFS) mode, the common electrode may be formed on the lower substrate SUBS1 together with the pixel electrode.

A first polarizing film POL1 is adhered to the lower substrate SUBS1 and a second polarizing film POL2 is adhered to the upper substrate SUBS2. An alignment film is formed for setting a pre-tilt angle of liquid crystal molecules on a surface in contact with the liquid crystal molecules in each of the lower substrate SUBS1 and the upper substrate SUBS2.

The display device may be implemented in any form such as a transmissive liquid crystal display device, a transflective liquid crystal display device, a reflective liquid crystal display device, and the like. In the transmissive liquid crystal display device and the transflective liquid crystal display device, a backlight unit (BLU) is required. The backlight unit (BLU) may be implemented as a direct type backlight unit or an edge type backlight unit.

The display panel drivers write data of the input image to the pixels of the display panel PNL1. The display panel drivers include a data driver 12 and a gate driver 14.

The data driver 12 receives the data of the input image from a timing controller 16. The data driver 12 converts the data of the input image into a positive/negative gamma compensation voltage under a control of the timing controller 16, and outputs a positive/negative data voltage. The data voltages output from the data driver 12 are applied to the data lines D1 to Dm.

The gate driver 14 sequentially applies gate pulses to the gate lines G1 to Gn under a control of the timing controller 16. The gate pulses output from the gate driver 14 are synchronized with the data voltages to be charged to the pixels. The gate driver 14 may be formed directly on the lower substrate SUBS1 of the display panel PNL1 together with the pixel array.

The timing controller 16 transmits the data of the input image received from a host system 18 to the data driver 12.

The timing controller 16 receives timing signals that are synchronized with the data of the input image from the host system 18. The timing signals include a vertical synchronization signal Vsync, a horizontal synchronization signal Hsync, a data enable signal DE, a clock MCLK, and the like. The timing controller 16 generates control signals DCS and GCS for controlling operation timings of the data driver 12 and the gate driver 14 using the timing signals Vsync, Hsync, DE, and MCLK received together with the data of the input image. In addition, the timing controller 16 generates a control signal SCS for controlling an operation timing of the mirror panel driver 20 using the timing signals Vsync, Hsync, DE and MCLK received from the host system 18. The timing controller 16 synchronizes the operation timings of the display panel drivers 12 and 14 and the mirror panel driver 20.

The host system 18 may be implemented as any one of the following: a television system, a set-top box, a navigation system, a DVD player, a Blue-ray player, a personal computer PC, a home theater system, and a phone system. The host system 18 may transmit the data of the input image and the timing signal synchronized with the data of the input image to the timing controller 16. The host system 18 includes a system on chip (SoC) with an embedded scaler, and may convert the digital video data of the input image into a format suitable for display on the display panel PNL1. The host system 18 executes an application program associated with coordinate information XY of a touch input received from the mirror panel driver 20.

A third polarizing film POL3 is disposed between the display panel PNL1 and the mirror panel PNL2. The third polarizing film POL3 is a reflective polarizing film. The third polarizing film POL3 has a transmission axis and a reflection axis. When linearly polarized light parallel to the transmission axis of the third polarizing film POL3 is incident on the third polarizing film POL3, the reflective polarizing film POL3 transmits the light. On the other hand, when linearly polarized light parallel to the reflection axis of the third polarizing film POL3 is incident on the third polarizing film POL3, the light is reflected. Thus, the third polarizing film POL3 enables mirror driving in the mirror display. Operations of a mirror mode and a display mode using the third polarizing film POL3 will be described in detail with reference to FIG. 9.

The mirror panel PNL2 operates in the mirror mode and the display mode by adjusting a phase delay of light passing through a liquid crystal layer LC2 depending on an electric field applied to the liquid crystal layer LC2. The mirror panel PNL2 reflects light incident from outside in the mirror mode, and operates as a mirror. On the other hand, the mirror panel PNL2 passes light incident from the display panel PNL1 as it is in the display mode, and shows an input image reproduced in the display panel PNL1 to a user. Electrodes E1 and E2 for applying an electric field to the liquid crystal layer L2 in the mirror panel PNL2 are divided into blocks of a predetermined size. The blocks may be set to a size of one pixel or more of the display panel PNL2.

The divided electrodes E1 and E2 enable the mirror mode and the display mode to be driven on a block-by-block basis in the mirror panel PNL2, and implement a block-sized in-cell touch sensor. In the mirror panel PNL2, if the block size is small and the blocks are arranged at a high density, fingerprint sensing as well as touch input is possible.

The mirror panel PNL2 can freely vary sizes of a mirror region MR and a display region DR using the divided electrodes E1 and E2. Since the mirror region MR and the display region DR are separated on a block-by-block basis in the mirror panel PNL2, when the mirror and the display are driven simultaneously in a screen, optical interference between transmitted light and reflected light between the mirror region MR and the display region DR can be minimized. Since the mirror panel PNL2 can independently drive the mirror mode and the display mode on a block-by-block basis using the divided electrodes E1 and E2, the mirror panel PNL2 can drive an entire screen in the mirror mode or in the display mode, further, simultaneously drive the mirror mode and the display mode within a screen of the mirror panel PNL2.

The mirror panel PNL2 includes a lower substrate SUBS3 and an upper substrate SUBS4 bonded together by a sealant material with the liquid crystal layer LC2 interposed therebetween.

Second electrodes E2 divided on a block-by-block basis of a predetermined size and mirror driving lines ML connected to the second electrodes E2 are disposed on the lower substrate SUBS3 of the mirror panel PNL2. The second electrodes E2 are connected to the mirror driving lines ML in a one-to-one relationship.

First electrodes E1 divided on a block-by-block basis of a predetermined size and sensor lines SL connected to the first electrodes E1 are disposed on the upper substrate SUBS4 of the mirror panel PNL2. The first electrodes E1 are connected to the sensor lines SL in a one-to-one relationship.

The first electrodes E1 and the second electrodes E2 face each other with the liquid crystal layer LC2 interposed therebetween in a one-to-one relationship as shown in FIG. 4. The liquid crystal layer LC2 delays a phase of light using liquid crystal molecules driven by an electric field generated by a potential difference between the first electrodes E1 and the second electrodes E2. Since the first electrodes E1 and the second electrodes E2 are divided on a block-by-block basis, the first electrodes E1 and the second electrodes E2 may divide the screen of the mirror panel PNL2 into blocks and independently adjust a voltage of the liquid crystal layer LC2 in each of the blocks. A block driven in the mirror mode includes the second electrode E2 to which a mirror driving signal of the mirror mode is applied. A block driven in the display mode includes the second electrode E2 to which a mirror driving signal of the display mode is applied. The block in which the mirror driving signal of the mirror mode is applied to the second electrode E2 reflects light incident from external light. On the other hand, the block in which the mirror driving signal of the display mode is applied to the second electrode E2 passes light from the display panel. Therefore, the mirror panel PNL2 can individually drive the liquid crystal layer LC2 in the mirror mode and the display mode on a block-by-block basis.

The third polarizing film POL3 is adhered to the lower substrate SUBS3 and a fourth polarizing film POL4 is adhered to the upper substrate SUBS4. An alignment film is formed for setting a pre-tilt angle of liquid crystal molecules on a surface in contact with the liquid crystal molecules in each of the lower substrate SUBS3 and the upper substrate SUBS4.

Figure 5:
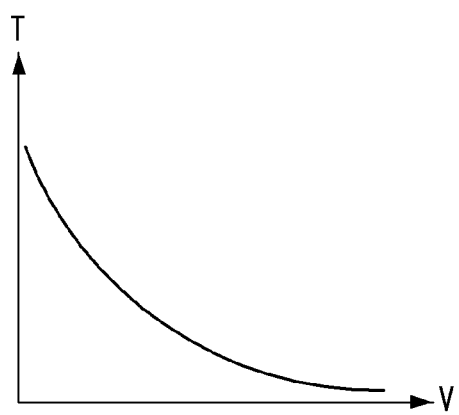
FIG. 5 is a graph of voltage vs. transmittance illustrating a normally white mode.

The mirror panel PNL2 is driven in a normally white mode. In the normally white mode, when a voltage V of the liquid crystal layer LC2 is minimum as shown in FIG. 5, the liquid crystal molecules are maintained in an initial state and delay a phase of incident light by 90°, so that transmittance T of the light passing through the polarizing film POL4 becomes maximum. On the other hand, in the normally white mode, as the voltage V of the liquid crystal layer LC2 increases, the liquid crystal molecules are driven and a phase delay value of the light passing through the liquid crystal layer LC2 becomes smaller, so that transmittance T of the light passing through the polarizing film POL4 becomes smaller.

Figure 9:
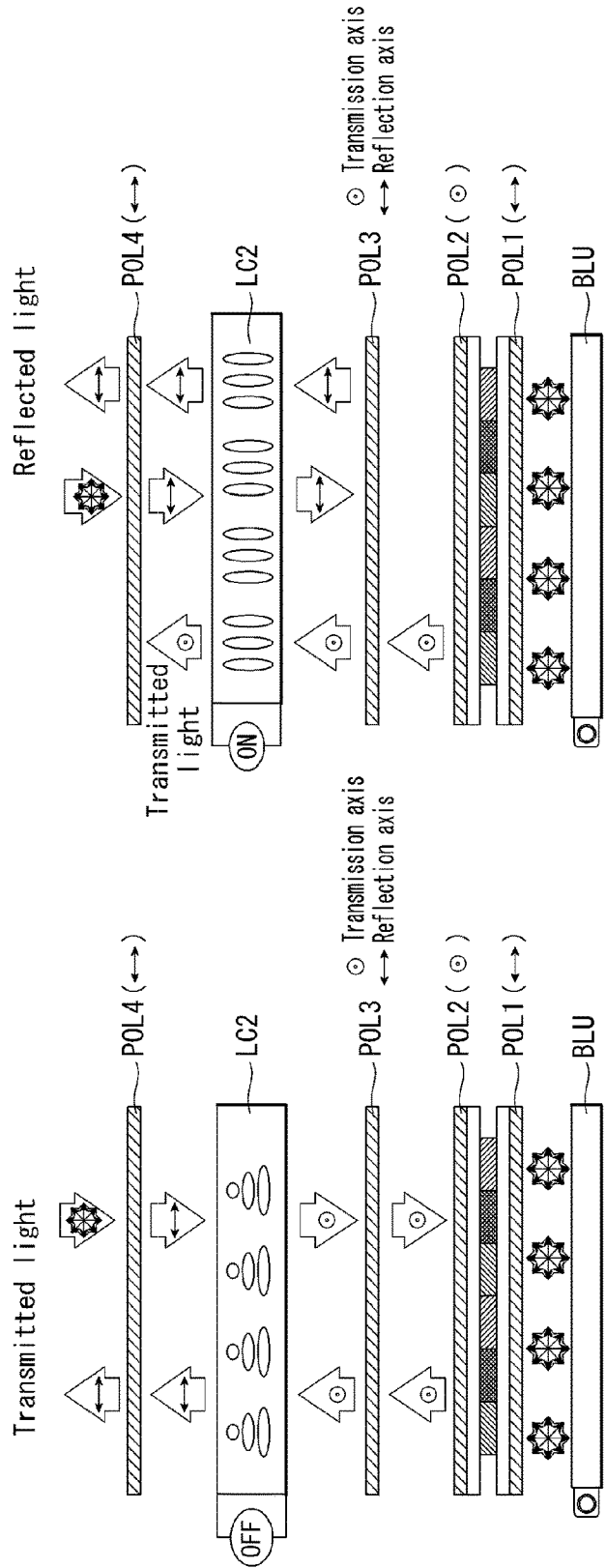
FIG. 9 is a cross-sectional view illustrating optical paths of transmitted light and reflected light in a mirror display according to one embodiment.

The third polarizing film POL3 of the mirror panel PNL2 is the reflective polarizing film as described above. An optical axis of light incident on the third polarizing film POL3 depends on whether the liquid crystal layer LC2 is driven or not. As a result, as shown in FIG. 9, a block having low transmittance T of the liquid crystal layer LC2 is driven in the mirror mode by increasing the amount of external light reflected from the third polarizing film POL3. On the other hand, a block having high transmittance T of the liquid crystal layer LC2 is driven in the display mode because the light transmitted through the third polarizing film POL3 increases.

In the mirror panel PNL2 operating in the normally white mode, a block having large voltage difference between the electrodes E1 and E2 operates in the mirror mode to reflect light. On the other hand, a block having no voltage difference between the electrodes E1 and E2 operates in the display mode to pass light from the display panel PNL2 and display an input image.

A typical example of the liquid crystal mode driven in the normally white mode is the TN mode. But the invention is not limited thereto. It should be noted that the liquid crystal driving mode of the mirror panel PNL2 is not limited to the normally white mode. The mirror panel PNL2 may be implemented in a normally black mode. A typical example of the normally black mode is the IPS mode.

The liquid crystal molecules are driven by the potential difference applied to the electrodes E1 and E2 without a TFT in the mirror panel PNL2. Accordingly, the mirror panel PNL2 is a liquid crystal panel driven by a passive matrix (PX) without a color filter array and a TFT array.

The mirror panel driver 20 is connected to the mirror driving lines ML and the sensor lines SL to drive the mirror panel PNL2 in the mirror mode and the display mode on a block-by-block basis. The mirror panel driver 20 applies a mirror driving signal to the second electrodes E2 through the mirror driving lines ML. The mirror driving signal selects the mirror driving mode or the display driving mode and inverts a polarity of a voltage applied to the liquid crystal layer LC2. When a DC voltage is applied to the liquid crystal layer LC2 for a long time, the liquid crystal layer LC2 is deteriorated and an after-image can be seen. Therefore, the polarity of the mirror driving signal applied to the liquid crystal layer LC2 is inverted every predetermined frame period, for example, one frame period.

The mirror panel driver 20 sequentially applies sensor driving signals (TDS in FIG. 15) to the first electrodes E1 through the sensor lines SL, and applies an AC signal (hereinafter, referred to as a load free driving (LFD) signal) having the same phase as the sensor driving signal TDS to the first electrodes E1 to which the sensor driving signal TDS is not applied. The LFD signal may be generated by an AC signal obtained by adding an AC signal swinging with the same voltage as a voltage of the sensor driving signal TDS to the common voltage Vcom which is a reference voltage of the liquid crystal layer LC2.

The first electrodes E1 of the mirror panel PNL2 are driven as an in-cell touch sensor to which the sensor driving signal TDS is sequentially applied. A sensing circuit of the mirror panel driver 20 sequentially applies the sensor driving signals TDS to the sensor lines SL and senses a touch input based on a capacitance change of each of the first electrodes E1 to which the sensor driving signal TDS is applied.

The sensing circuit of the mirror panel driver 20 applies the sensor driving signal TDS to the first electrode E1 of the in-cell touch sensor to be sensed and applies the LFD signal to the other first electrodes E1 to minimize a parasitic capacitance of the in-cell touch sensor. The sensing circuit sequentially applies the sensor driving signal TDS to all the first electrodes E1 to sense the touch input. The sensing circuit is connected to the sensor line SL connected to the in-cell touch sensor to which the sensor driving signal TDS is applied, and senses a capacitance change before and after the touch input. The sensing circuit compares an amount of the capacitance change of the in-cell touch sensor with a preset threshold value, and judges a touch sensor having the amount of the capacitance change larger than the threshold value as a touch input position. The sensing circuit calculates coordinates of the touch input position to generate coordinate information (XY) and transmits it to the host system 18.

The mirror panel driver 20 includes a multiplexer for switching a current path between the sensing circuit and the sensor lines SL. The multiplexer is omitted from the drawing. The multiplexer connects the sensor line SL to which the sensor driving signal TDS is applied to the sensing circuit while blocking a current path between the sensor line SL to which the LFD signal is applied and the sensing circuit.

Figure 6A:
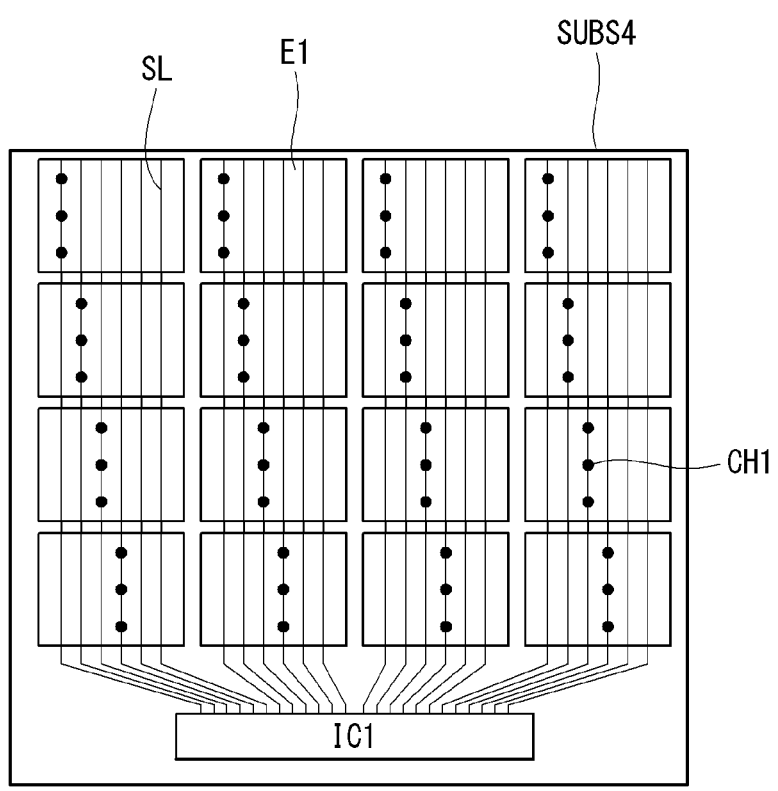
FIG. 6A is a plan view illustrating first electrodes and sensor lines of a mirror panel according to one embodiment.
Figure 6B:
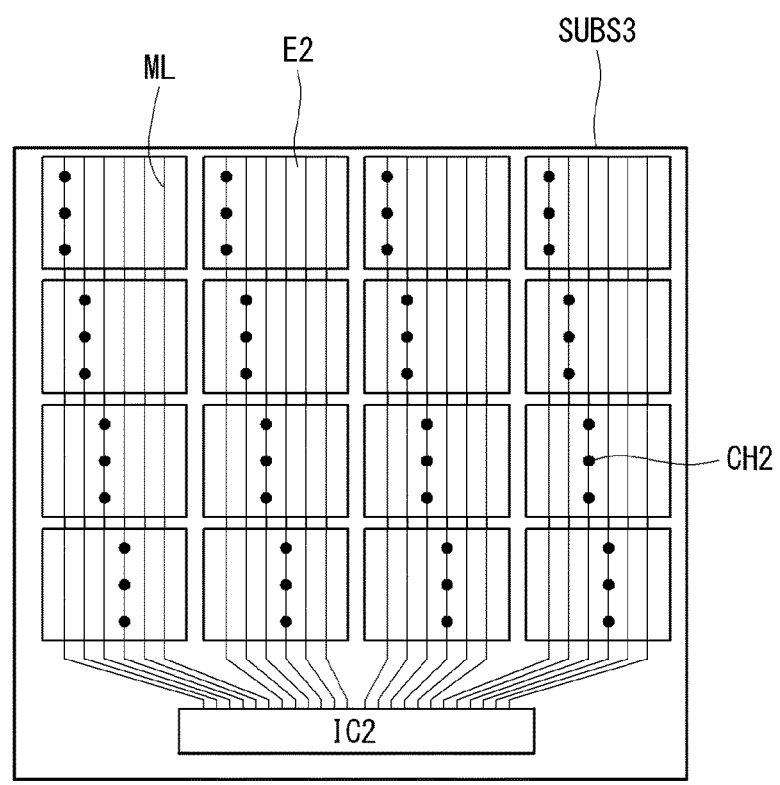
FIG. 6B is a plan view illustrating second electrodes and mirror driving lines of a mirror panel according to one embodiment.

The mirror panel driver 20 may be divided into two integrated circuits (ICs), or integrated into one IC as shown in FIGS. 6A and 6B. IC1 shown in FIG. 6A applies the sensor driving signal TDS and the LFD signal to the first electrodes E1 and senses a capacitance change of the electrode E1 to which the sensor driving signal TDS is applied. IC2 shown in FIG. 6B applies a mirror driving signal.

The capacitance of the in-cell touch sensor is coupled with the electrodes E1 and E2 and lines SL and ML close to the in-cell touch sensor, so that the parasitic capacitance becomes large. When the parasitic capacitance of the in-cell touch sensor becomes large, noise of the in-cell touch sensor signal becomes large. When the LFD signal is applied to the electrodes E1 and E2 and the lines SL and ML except for the first electrode E1 which is operated as the in-cell touch sensor by the sensor driving signal TDS, the parasitic capacitance of the in-cell touch sensor can be reduced. This is because a voltage difference across the parasitic capacitance can be minimized to minimize an amount of charge of the parasitic capacitance. By reducing the parasitic capacitance of the in-cell touch sensor, a signal-to-noise ratio (SNR) of the touch sensor signal can be improved to widen an operation margin of the sensing circuit in the mirror panel driver 20 and increase a sensing sensitivity.

FIG. 6A is a plan view illustrating first electrodes E1 and sensor lines SL of a mirror panel PNL2. FIG. 6B is a plan view illustrating second electrodes E2 and mirror driving lines ML of a mirror panel PNL2.

Referring to FIG. 6A, in the mirror panel PNL2, the first electrodes E1 divided on a block-by-block basis overlap the sensor lines SL with an insulating layer interposed therebetween. The first electrodes E1 are connected to the sensor lines SL through a contact hole CH1 passing through the insulating layer.

Referring to FIG. 6B, in the mirror panel PNL2, the second electrodes E2 divided on a block-by-block basis overlap the mirror driving lines ML with an insulating layer interposed therebetween. The second electrodes E2 are connected to the mirror driving lines ML through a contact hole CH2 through the insulating layer.

Figure 7:
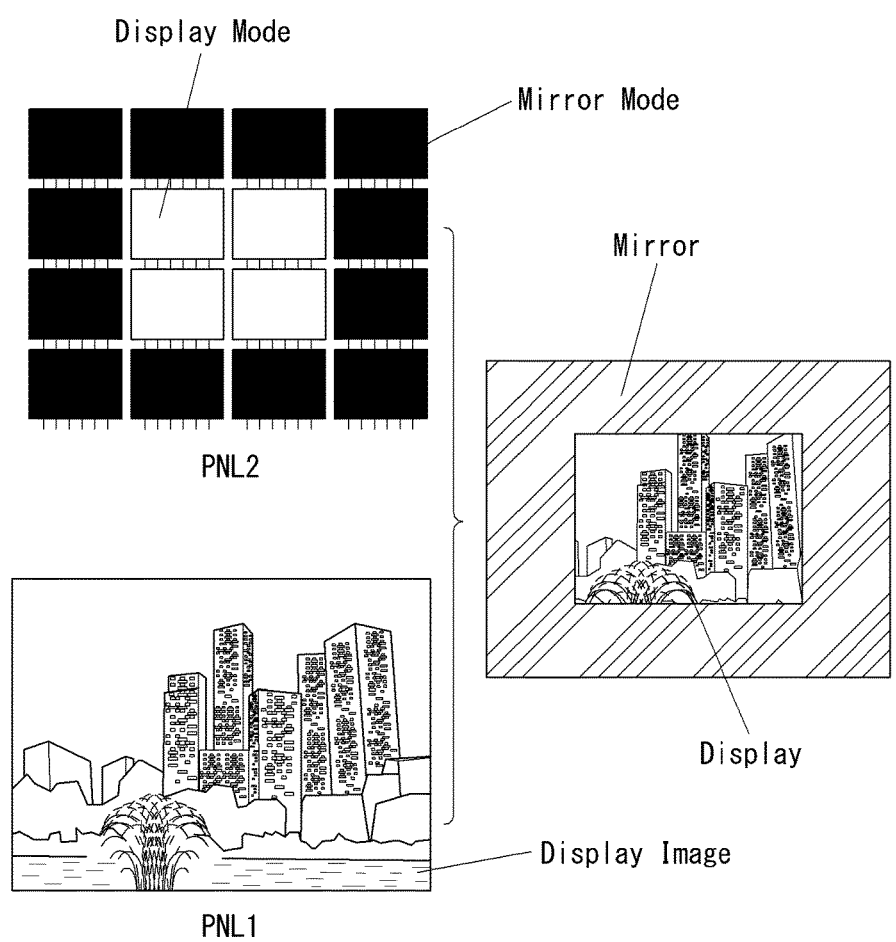
FIGS. 7 and 8 illustrate operations of a mirror display according to one embodiment.
Figure 8:
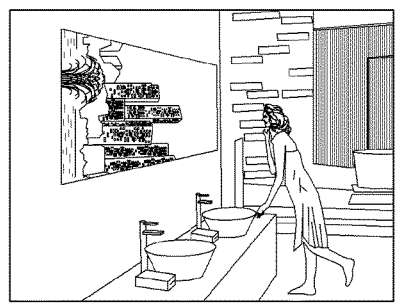
Figure 8:
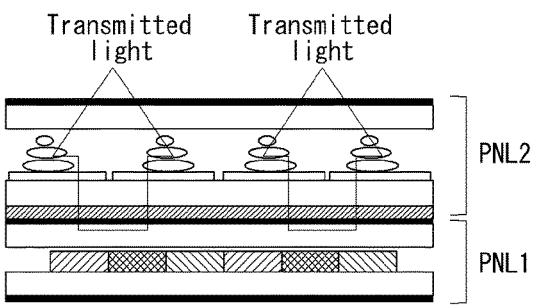
Figure 8:
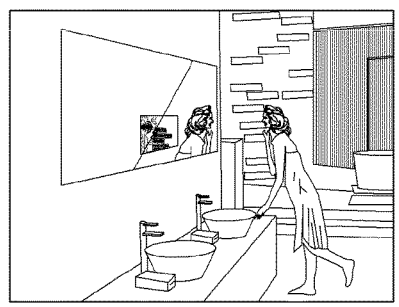
Figure 8:
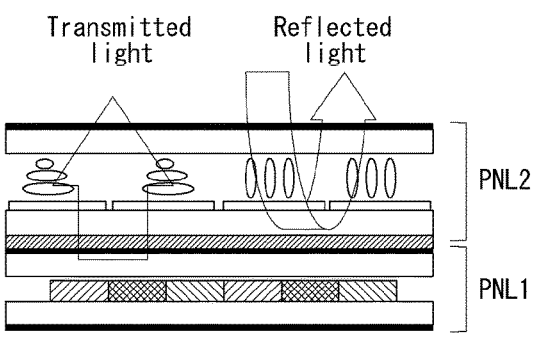
Figure 8:
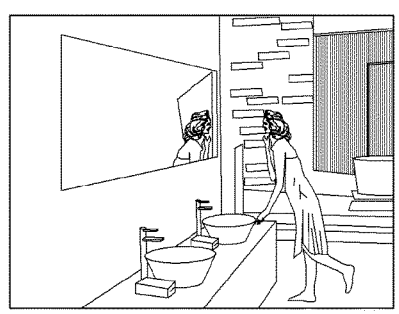
Figure 8:
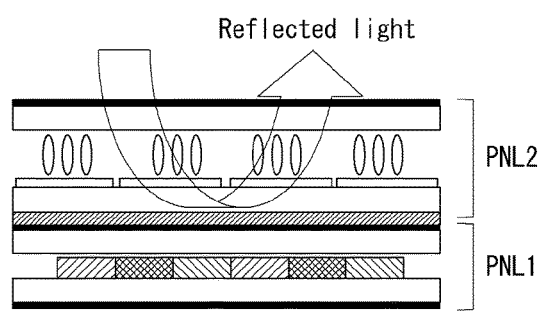

FIGS. 7 and 8 illustrate operations of a mirror display according to an embodiment of the invention.

Referring to FIGS. 7 and 8, light of the display panel PNL2 is passed through the third polarizing film POL3 of a block (hereinafter, referred to as "display block") having a small potential difference between the electrodes E1 and E2 for applying an electric field to the liquid crystal layer LC2 of the mirror panel PNL2. The display block has high transmittance and low reflectance. Thus, an input image is visible in the display block of the mirror panel.

In a block (hereinafter, referred to as "mirror block") having no voltage difference between the electrodes E1 and E2 of the mirror panel PNL2, light does not pass through the display panel PNL1 and external light is reflected on the third polarizing film POL3. The mirror block has high reflectance and low transmittance. Therefore, an input image is not visible in the mirror block, but an inverted image of an external image is visible as reflected light.

[Display driving] in FIG. 8 is an example in which an entire screen of the mirror display is driven by the display blocks. [Mirror driving] in FIG. 8 is an example in which an entire screen of the mirror display is driven by the mirror blocks. [Multi driving] in FIG. 8 is an example in which the mirror blocks and the display blocks are simultaneously driven on the screen of the mirror display and the input image and the external image are displayed together.

FIG. 9 is a cross-sectional view illustrating optical paths of transmitted light and reflected light in a mirror display according to one embodiment.

Referring to FIG. 9, transmission axes of the first and second polarizing films PO1 and POL2 are orthogonal to each other. The third polarizing film POL3 is a reflective polarizing film having a transmission axis and a reflection axis orthogonal to each other. The transmission axis of the third polarizing film POL3 is parallel to the transmission axis of the second polarizing film POL2, that is, the upper polarizing film of the display panel PNL1. The transmission axis of the third polarizing film POL3 is orthogonal to the transmission axis of the fourth polarizing film POL4, that is, the upper polarizing film of the mirror panel PNL2.

An optical axis of first linearly polarized light is an optical axis of linearly polarized light parallel to the transmission axis of the third polarizing film POL 3. An optical axis of second linearly polarized light is an optical axis of linearly polarized light parallel to the reflection axis of the third polarizing film POL3. The first linearly polarized light may be vertical linearly polarized light, and the second linearly polarized light may be horizontal linearly polarized light, but this is merely an example, and the invention is not limited thereto. For example, the optical axis of the linearly polarized light may be changed depending on the transmission axis of the polarizing films POL1 to POL4.

In the display mode, the optical axis of the first linearly polarized light that has passed through the display panel PNL coincides with the transmission axis of the third polarizing film POL3 so that the first linearly polarized light is incident on the liquid crystal layer LC2. A phase of the first linearly polarized light in the liquid crystal layer LC2 is delayed by 90°, so that the first linearly polarized light is converted into the second linearly polarized light. The optical axes of the first linearly polarized light and the second linearly polarized light are orthogonal to each other. In the display mode, since a potential difference between the electrodes E1 and E2 of the display block is minimum, the liquid crystal molecules of the liquid crystal layer LC2 maintain their initial alignment state (OFF) and remain in a twisted state. The second linearly polarized light having passed through the liquid crystal layer LC2 passes through the fourth polarizing film POL4. The user can see an image of the image input to the display panel PNL1 as the light passing through the display blocks of the mirror panel PNL2.

In the mirror mode, the optical axis of the first linearly polarized light that has passed through the display panel PNL1 coincides with the transmission axis of the third polarizing film POL3 so that the first linearly polarized light is incident on the liquid crystal layer LC2. The first linearly polarized light passes through the liquid crystal layer LC2 without a phase delay and is directly incident on the fourth polarizing film POL4. The first linearly polarized light from the display panel PNL1 does not pass through the fourth polarizing film POL4 because the optical axis of the first linearly polarized light and the transmission axis of the fourth polarizing film POL4 are orthogonal to each other. In mirror mode, an electric potential difference between the electrodes E1 and E2 of the mirror block becomes large, and an electric field is applied to the liquid crystal layer LC2 (ON) to drive the liquid crystal molecules.

In the mirror mode, external light passing through the transmission axis of the fourth polarizing film POL4 is the second linearly polarized light. The second linearly polarized light of the external light passes through the liquid crystal layer LC2 and is reflected by the third polarizing film POL3. Since the optical axis of the second linearly polarized light is parallel to the reflection axis of the third polarizing film POL3, the second linearly polarized light does not pass through the third polarizing film POL3 and is reflected by the third polarizing film POL3. The second linearly polarized light reflected by the third polarizing film POL3 passes through the liquid crystal layer LC2 as it is and passes through the fourth polarizing film POL4. The user can thus see an inverted image of the external image on the mirror blocks with the light reflected from the mirror panel PNL2.

Figure 10:
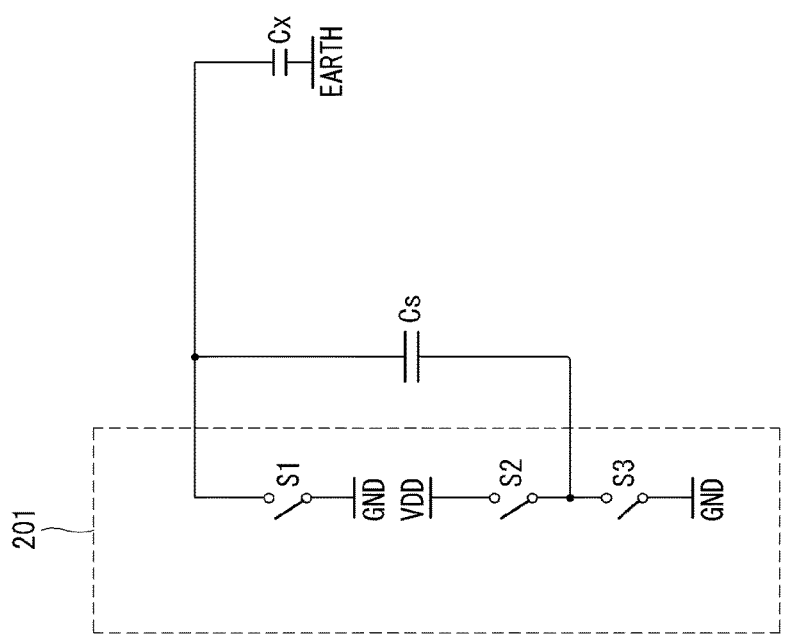
FIG. 10 is a circuit diagram illustrating an equivalent circuit of a sensing circuit before touch input according to one embodiment.
Figure 11:
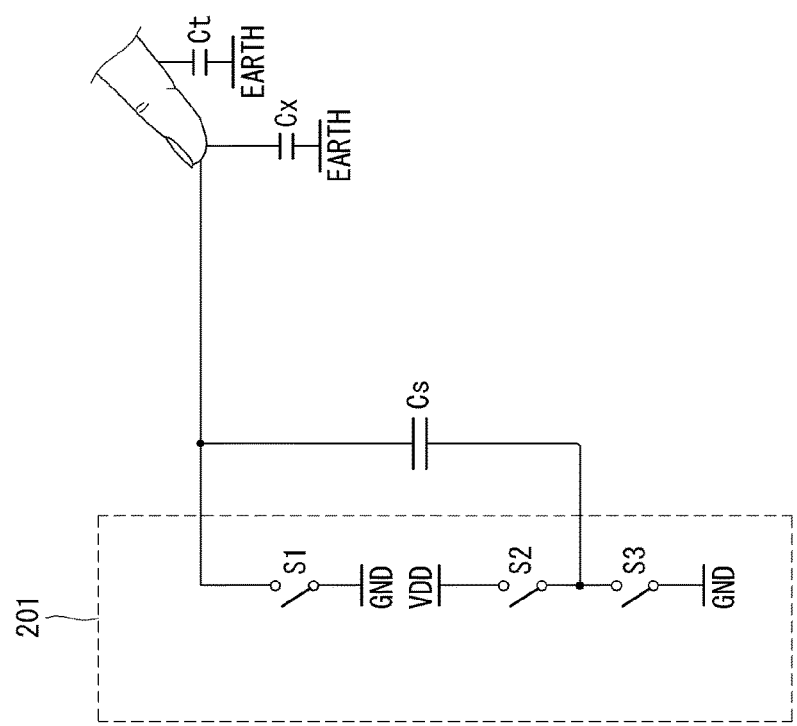
FIG. 11 is a circuit diagram illustrating an equivalent circuit of a sensing circuit after touch input according to one embodiment.
Figure 12A:
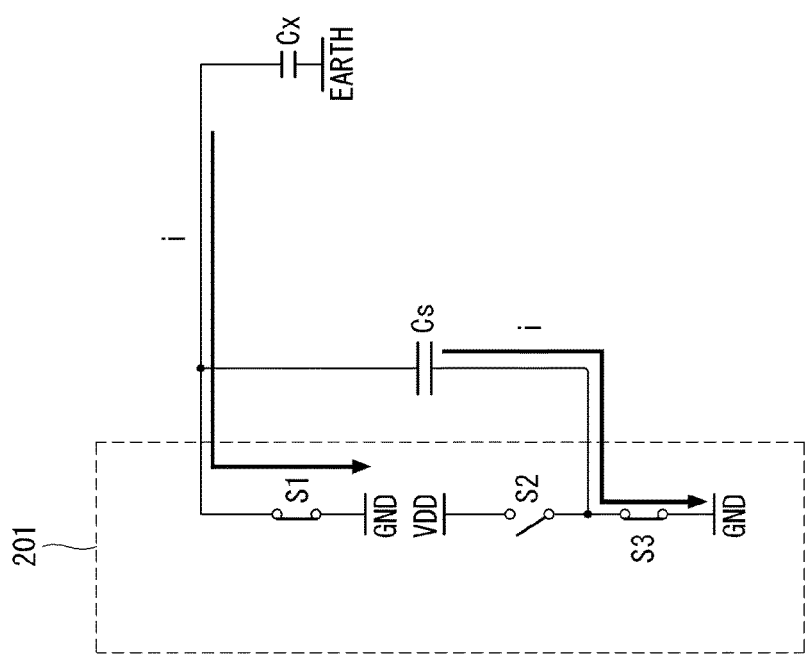
FIGS. 12A to 12E are circuit diagrams illustrating operation of a sensing circuit according to one embodiment.
Figure 12B:
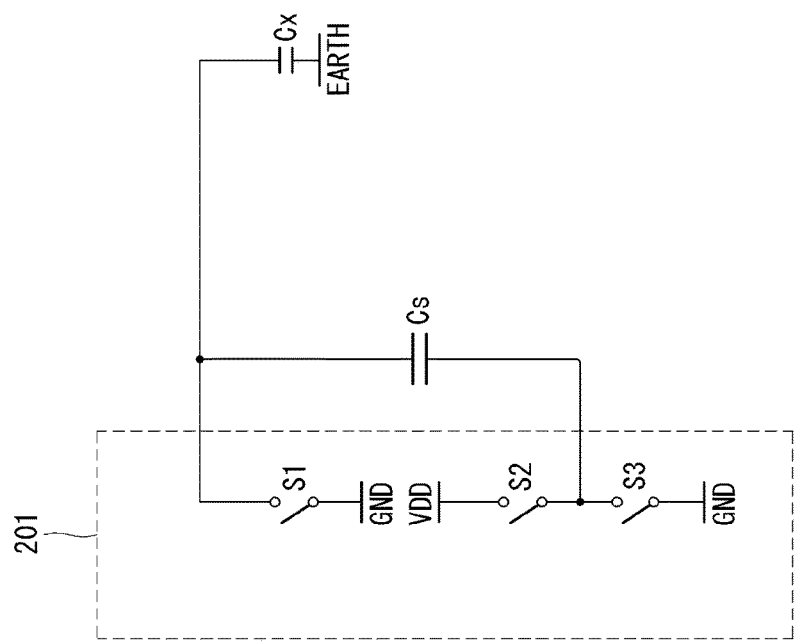
Figure 12C:
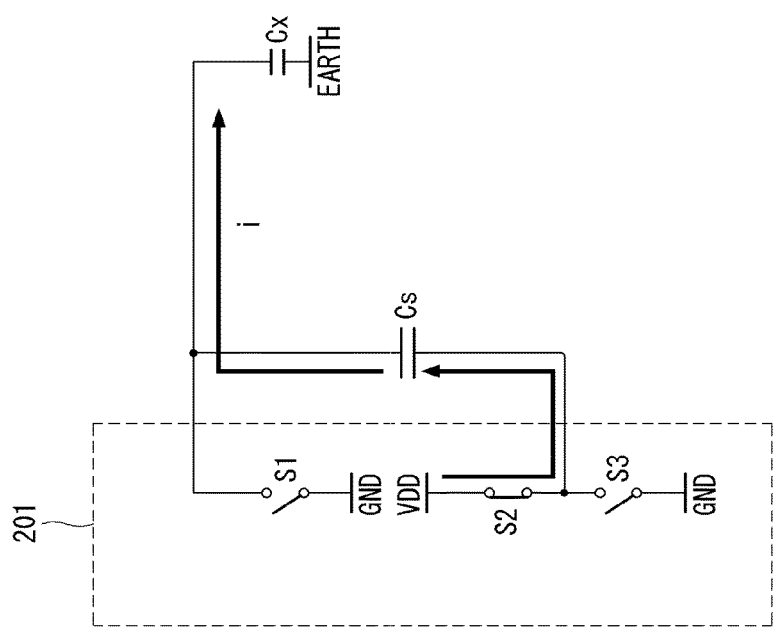
Figure 12D:
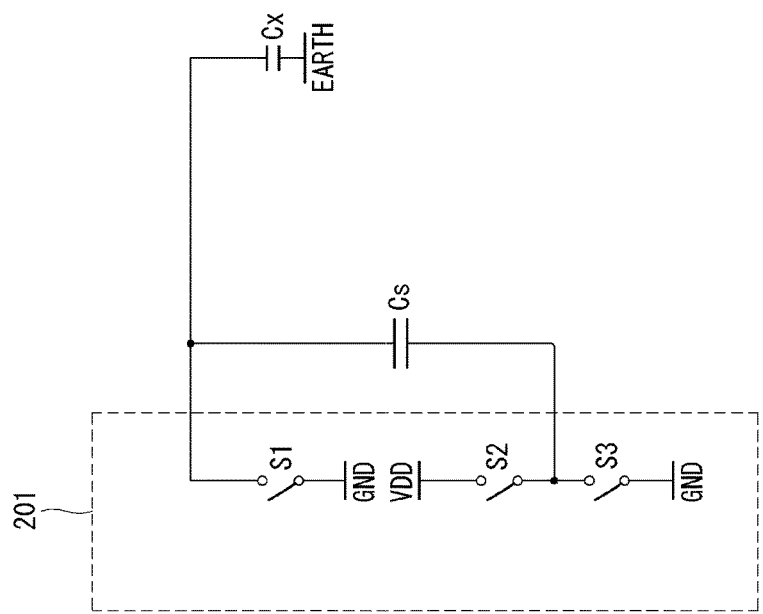
Figure 12E:
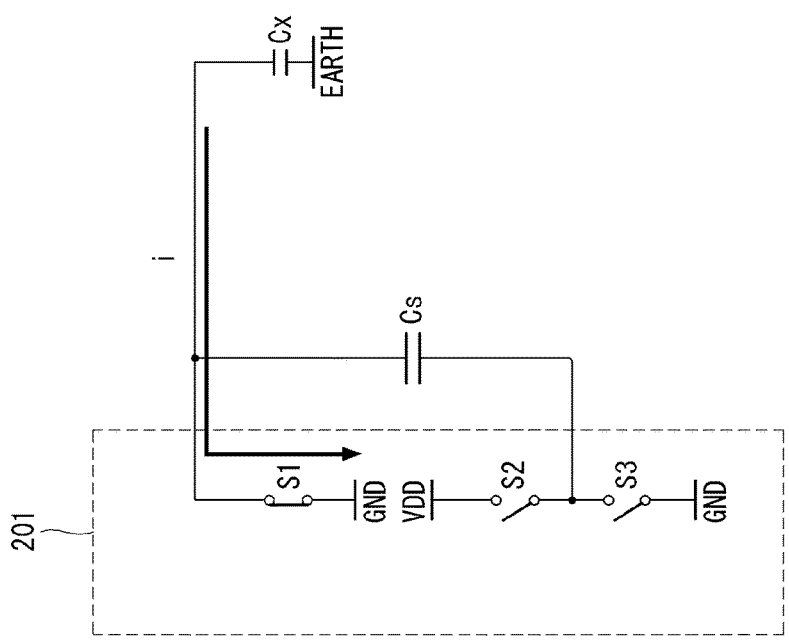

FIG. 10 is a circuit diagram illustrating an equivalent circuit of a sensing circuit before touch input. FIG. 11 is a circuit diagram illustrating an equivalent circuit of a sensing circuit after touch input. It should be noted that FIGS. 10 and 11 are represented by the simplest circuit to show the principle of the sensing circuit. An actual sensing circuit includes a multiplexer for switching a current path between sensor lines and a sensing circuit, an amplifier received through the sensor lines, an integrator for accumulating an output of the amplifier in a sampling capacitor Cs, an analog-to-digital converter (ADC) for converting an output voltage of the integrator into digital data, a counter, and the like.

Referring to FIGS. 10 and 11, the sensing circuit includes the first to third switches S1 to S3 and a sampling capacitor Cs. Cx is an in-cell touch sensor. Cs has a capacitance about 1000 times larger than Cx.

When a finger is touched on the mirror panel PNL2, a capacitor Ct due to the finger is connected to the sensing circuit. Therefore, a capacitance of the in-cell touch sensor increases when the touch is input. As a result, a voltage of the sampling capacitor Cs after touch input is sampled at a voltage higher than a voltage of the sampling capacitor Cs before the touch input.

FIGS. 12A to 12E are circuit diagrams illustrating operation of a sensing circuit 201 according to one embodiment. In FIGS. 12A to 12E, i is a current.

In Step 1 (FIG. 12A), while the first and third switches S1 and S3 are turned on, the second switch S2 is turned off. At this time, the sampling capacitor Cs and the in-cell touch sensor Cx are connected to a ground voltage source GND so that the sampling capacitor Cs is discharged. In step 1, the sampling capacitor Cs and the in-cell touch sensor Cx are reset.

In Step 2 (FIG. 12B), the first to third switches S1 to S3 are turned off. Step 2 is a standby state before charge is supplied to the in-cell touch sensor Cx.

Step 3 (FIG. 12C) is a charge transfer step. In Step 3, when the second switch S2 is turned on, a power supply voltage VDD is applied to the sampling capacitor Cs to charge the sampling capacitor Cs and the in-cell touch sensor Cx. VDD is a high level voltage of the sensor driving signal TDS.

In Step 4 (FIG. 12D), the second switch S2 is turned off. As a result, the sampling capacitor Cs and the in-cell touch sensor Cx are on standby in a floating state after charging charges.

In Step 5 (FIG. 12E), the first switch S1 is turned on. In Step 5, the in-cell touch sensor Cx is discharged through the first switch S1. A voltage Vcs of the sampling capacitor Cs is measured, and the voltage Vcs is compared with a preset reference voltage Vref.

Figure 13:
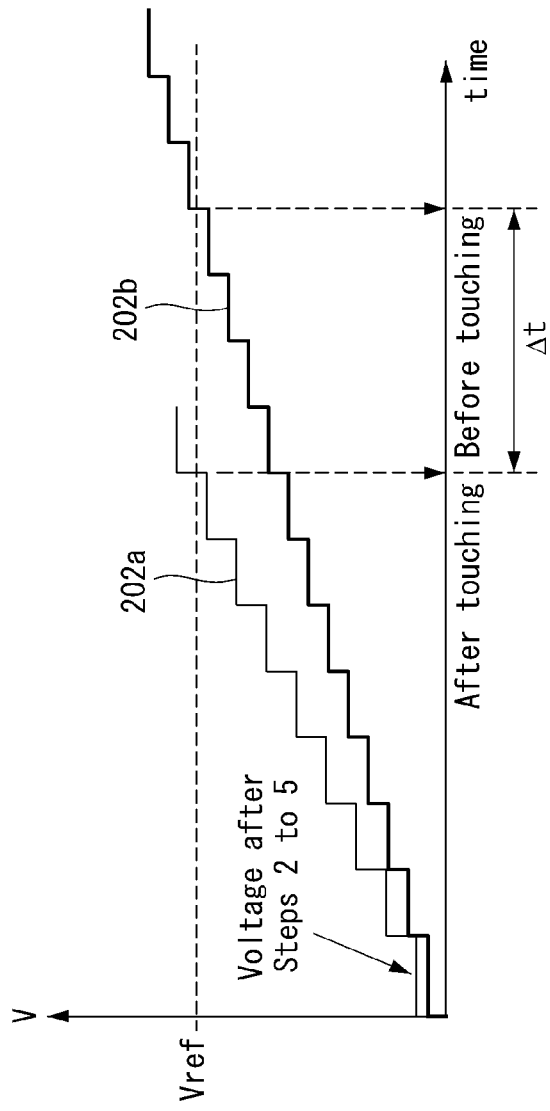
FIG. 13 is a waveform diagram comparing voltages accumulated in a sensing circuit before and after touch.

Referring to FIG. 13, the sensing circuit 201 compares the voltage Vcs of the sampling capacitor Cs with the preset reference voltage Vref and when Vcs is equal to or lower than Vref, the sensing circuit 201 repeats Steps 2 to 5 until Vcs reaches Vref. When Vcs reaches Vref, the sensing circuit 201 performs Step 1 to discharge and reset the sampling capacitor Cs and the in-cell touch sensor Cx.

When a touch input occurs (after touching), as shown in FIG. 11, since the capacitance of the in-cell touch sensor Cx is increased due to Ct, a charged amount of the in-cell touch sensor Cx becomes larger than when there is no touch input (before touching). Therefore, when a touch input occurs, Vcs reaches Vref in a shorter time. As a result, when the sensing circuit 201 measures a time until Vcs reaches Vref, since the sensing circuit 201 can know a capacitance change of the in-cell touch sensor Cx before and after touching, the sensing circuit 201 can sense the touch input. In FIG. 13, reference numeral 202a denotes a voltage Vcs of the sampling capacitor CS connected to touched in-cell touch sensor Cx. Reference numeral 202b denotes a voltage Vcs of the sampling capacitor CS connected to non-touched (before touching) in-cell touch sensor Cx.

Figure 14:
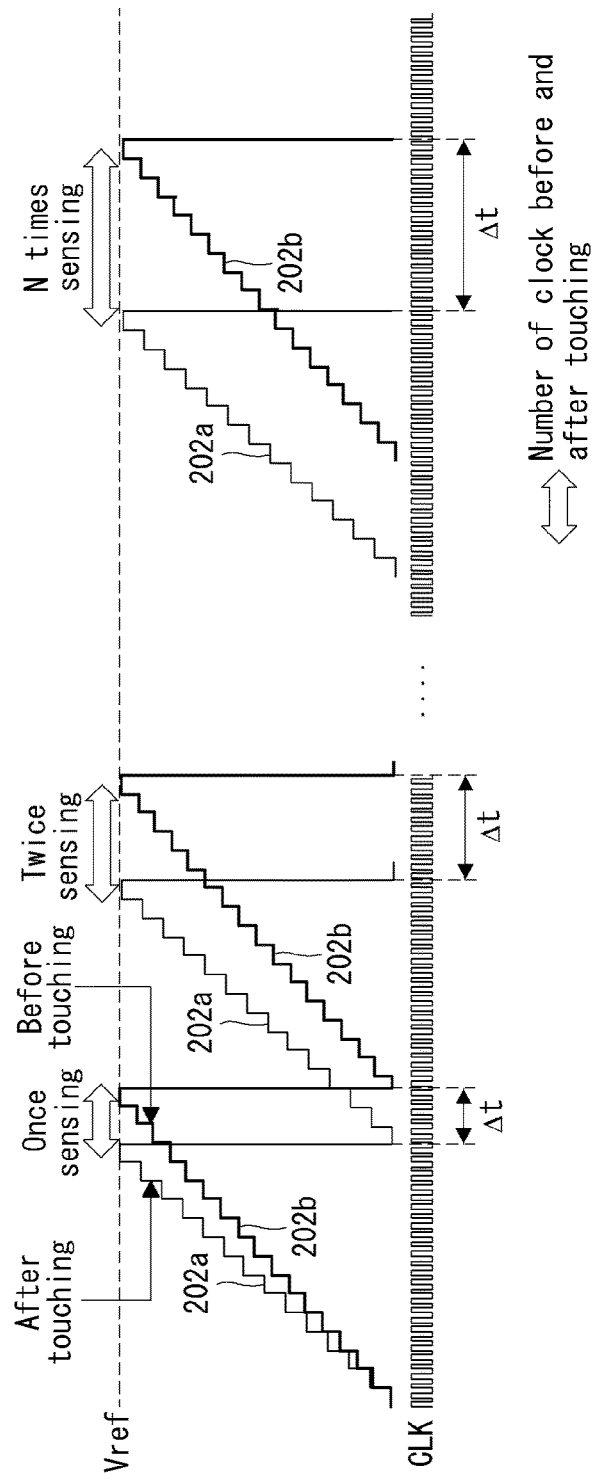
FIG. 14 is a waveform diagram illustrating that sensing sensitivity is improved as the number of sensing in an in-cell touch sensor increases.

Every time the sensor driving signal TDS is generated once, the above-described sensing operation is generated once. As the number of sensing increases, a time difference Δ T until Vcs reaches Vref before and after the touching increases. The sensing circuit 201 compares Vcs and Vref using a method of comparing an output data of the ADC to which the output voltage Vcs of the integrator is input with a digital value of Vref. As shown in FIG. 14, the sensing circuit 201 accumulates values of the counter for counting a clock CLK for the time until Vcs reaches Vref, and measures Δ T. Therefore, a capacitance change amount of the in-cell touch sensor Cx before and after the touching can be known. As shown in FIG. 14, as the number of sensing increases, the time difference Δ T before and after the touching increases. Therefore, a sensing sensitivity is improved.

Figure 15:
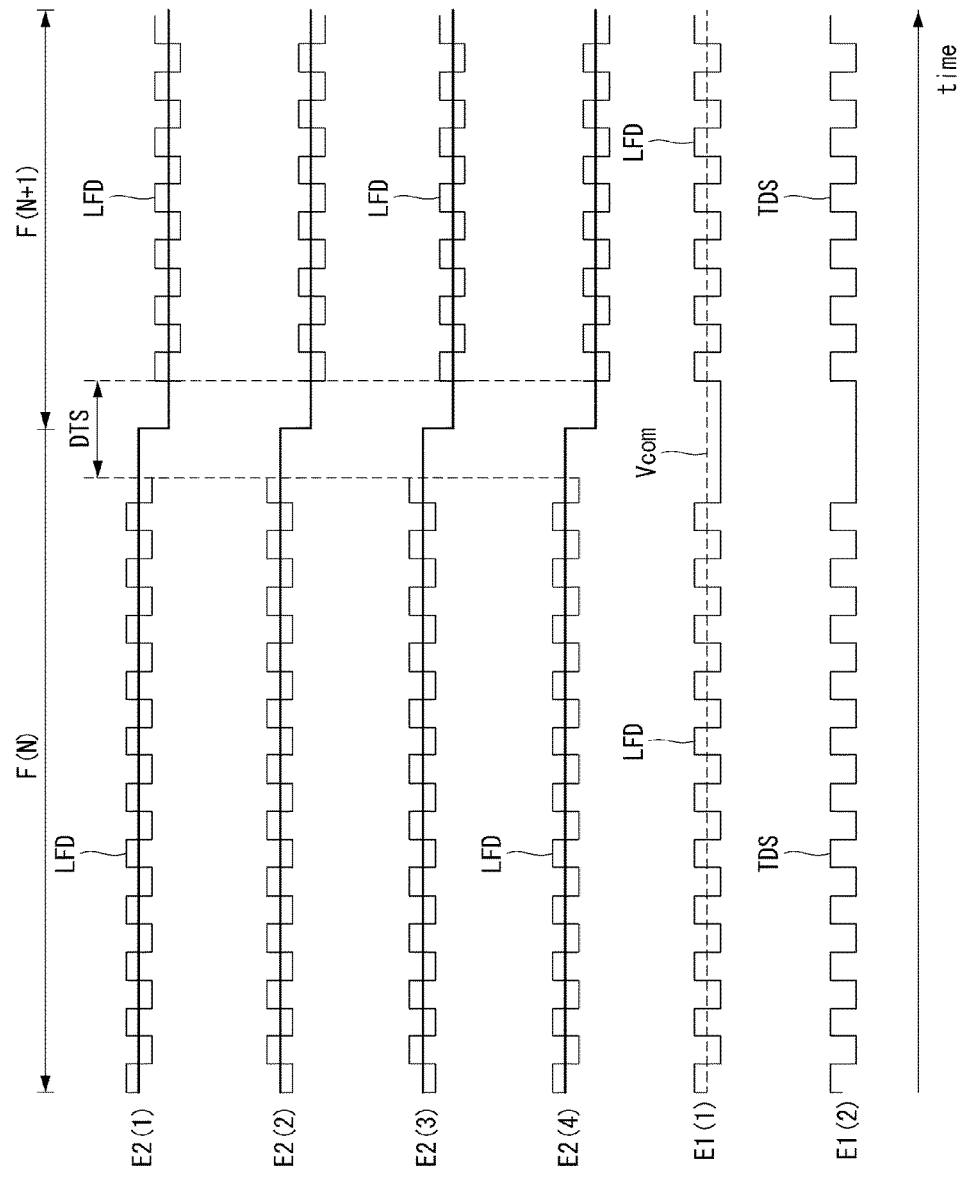
FIG. 15 is a waveform diagram illustrating signals applied to electrodes of a mirror panel.

As shown in FIG. 15, the pixels of the display panel and the in-cell touch sensor of the mirror panel are simultaneously driven, and the in-cell touch sensor and the mirror are simultaneously driven in the mirror panel. Therefore, since the display period and the touch sensing period are not time-divided, the number of sensing in the in-cell touch sensor can be greatly increased. On the other hand, since the conventional in-cell touch sensor technology divides one frame period into a display period and a touch sensing period, the number of sensing in the in-cell touch sensor cannot be increased due to lack of time.

FIG. 15 is a waveform diagram illustrating signals applied to electrodes of a mirror panel.

Referring to FIG. 15, the mirror panel driver 20 applies a mirror driving signal to the second electrodes E2 through the mirror driving lines ML. A polarity of the mirror driving signal may be inverted in units of a predetermined time to prevent the deterioration of the liquid crystal due to the direct current driving of the liquid crystal. The predetermined time may be one frame period, but is not limited thereto. When a low level voltage of the mirror driving signal is changed, the polarity of the mirror driving signal is inverted.

When the polarity of the mirror driving signal is inverted, since the charge of the in-cell touch sensor fluctuates, touch sensing can be inaccurate. To prevent this, during a polarity transition period DTS in which the polarity of the mirror driving signal is inverted, the sensing circuit 201 does not generate the sensor driving signal TDS. The polarity transition period DTS is a very short period of time, approximately 1 to 2 horizontal periods. In FIG. 15, F(N) is a Nth (N is a positive integer) frame period, and F(N+1) is a (N+1)-th frame period.

The mirror driving signals applied to the second electrodes E2 select the mirror driving mode and the display driving mode. When the mirror driving signal is in the same phase as the signals TDS and LFD applied to the first electrode E1, since there is no potential difference between the first electrode E1 and the second electrode E2, the block operates in the display mode. When the mirror driving signal is reverse phase with respect to the signals TDS and LFD applied to the first electrode E1, since a potential difference between the first electrode E1 and the second electrode E2 is large, the block operates in the mirror mode.

In FIG. 15, E2 (1) is a second electrode of a block which operates in a display mode during the Nth and (N+1)-th frame periods F(N) and F(N+1). E2 (2) is a second electrode of a block which operates in a mirror mode during the Nth and (N+1)-th frame periods F(N) and F(N+1). E2 (3) is a second electrode of a block which operates in a mirror mode during the Nth frame period F(N) and operates in a display mode during the (N+1)-th frame period F(N+1). E2 (4) is a second electrode of a block which operates in a display mode during the Nth frame period F(N) and operates in a mirror mode during the (N+1)-th frame period F(N+1).

In order to minimize a parasitic capacitance of the in-cell touch sensor, an LFD signal is applied to the first electrodes E1(1) other than the first electrode E1(2) to which the sensor driving signal TDS is applied. The LFD signal is also applied to the second electrodes E2 to which the mirror driving signal of the mirror mode is not applied.

As described above, according to the invention, the mirror region and the display region are independently controlled on a block-by-block basis using the electrodes divided on a block-by-block basis in the mirror panel. Therefore, the mirror region and the display region can be varied. Since the mirror region and the display region are divided on a block-by-block basis, the optical interference between the reflected light and the transmitted light can be reduced. Further, according to the invention, the in-cell touch sensor is implemented using the divided electrodes in the mirror panel. Therefore, the touch input can be sensed without a separate touch panel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mirror display comprising:
   a mirror panel including:
      a first substrate;
      a plurality of first electrodes on the first substrate;
      a plurality of sensor lines on the first substrate, the plurality of sensor lines connected to the plurality of first electrodes;
      a second substrate;
      a plurality of second electrodes on the second substrate, the plurality of second electrodes facing the first substrate;
      a liquid crystal layer interposed between the plurality of first electrodes and the plurality of second electrodes;
      a plurality of mirror driving lines on the second substrate, the plurality of mirror driving lines connected to the plurality of second electrodes; and
      a reflective polarizing film attached to the second substrate,
   a mirror panel driver configured to apply a sensor driving signal to the plurality of first electrodes through the plurality of sensor lines to sense a touch on the mirror panel, and apply a mirror driving signal to the plurality of second electrodes through the plurality of mirror driving lines, the mirror driving signal selecting either a mirror mode or a display mode of the mirror panel;
   a display panel on the mirror panel, the display panel configured to display an input image; and
   a display panel driver configured to write data of the input image to pixels of the display panel through data lines.

2. The mirror display of claim 1, wherein the plurality of first electrodes and the plurality of second electrodes of the mirror panel are divided into a plurality of blocks having a predetermined size.

3. The mirror display of claim 2, wherein the mirror driving signal of the mirror mode is applied to a first set of second electrodes from the plurality of second electrodes that is included in a first block and drives the first set of second electrodes in the mirror mode, and the mirror driving signal of the display mode is applied to a second set of second electrodes from the plurality of second electrodes that is included in a second block and drives the second set of second electrodes in the display mode while the first set of second electrodes is driven in the mirror mode.

4. The mirror display of claim 3, wherein light incident from external light is reflected on a portion of the reflective polarizing film corresponding to the first block while the first set of second electrodes is driven in the mirror mode, and
   wherein light from the display panel passes through a portion of the reflective polarizing film corresponding to the second block while the second set of second electrodes is driven in the display mode.

5. The mirror display of claim 4, wherein the mirror panel is a liquid crystal panel driven in a normally white mode.

6. The mirror display of claim 5, wherein the mirror driving signal is in a same phase as the sensor driving signal responsive to the mirror driving signal being in the display mode, and the mirror driving signal has a phase that is reversed from a phase of the sensor driving signal responsive to the mirror driving signal being in the mirror mode.

7. The mirror display of claim 6, wherein an alternating current (AC) signal having a same phase as the sensor driving signal is applied to the plurality of first electrodes that do not receive the sensor driving signal.

8. The mirror display of claim 1, wherein the sensor driving signal is not generated responsive to an inversion of a polarity of the mirror driving signal.

9. The mirror display of claim 1, further comprising:
   a polarizing film attached to the first substrate.

10. A mirror display panel comprising:
    a first substrate;
    a plurality of first electrodes on the first substrate;
    a plurality of sensor lines on the first substrate, the plurality of sensor lines connected to the plurality of first electrodes;
    a second substrate;
    a plurality of second electrodes on the second substrate, the plurality of second electrodes facing the first substrate;
    a liquid crystal layer interposed between the plurality of first electrodes and the plurality of second electrodes;
    a plurality of mirror driving lines on the second substrate, the plurality of mirror driving lines connected to the plurality of second electrodes;
    a reflective polarizing film attached to the second substrate; and
    a display panel on the mirror panel, the display panel configured to display an input image by writing data of the input image to pixels of the display panel via data lines.

11. The mirror display panel of claim 10, further comprising:
    a polarizing film attached to the first substrate.

12. The mirror display panel of claim 10, wherein the plurality of first electrodes and the plurality of second electrodes of the mirror panel are divided into a plurality of blocks having a predetermined size.

13. The mirror display panel of claim 10, wherein the mirror display panel is a liquid crystal panel driven in a normally white mode.

14. A mirror display panel comprising:
    a first substrate;
    a plurality of first electrodes on the first substrate;
    a second substrate;
    a plurality of second electrodes on the second substrate that face the first substrate, the plurality of second electrodes comprising a first set of second electrodes and a second set of second electrodes;
    a liquid crystal layer interposed between the plurality of first electrodes and the plurality of second electrodes;
    a plurality of mirror driving lines on the second substrate, the plurality of mirror driving lines comprising a first set of mirror driving lines and a second set of mirror driving lines, the first set of mirror driving lines connected to the first set of second electrodes, and the second set of mirror driving lines connected to the second set of second electrodes; and
    a plurality of sensor lines on the first substrate, the plurality of sensor lines connected to the plurality of first electrodes,
    wherein the first set of second electrodes reflect external light incident on the first set of second electrodes responsive to the first set of second electrodes receiving a mirror driving signal in a mirror mode via the first set of mirror driving lines, and wherein the second set of second electrodes passes light received from a display panel that is on the mirror display panel while the first set of second electrodes reflects external light responsive to the second set of second electrodes receiving the mirror driving signal in a display mode via the second set of mirror driving lines.

15. The mirror display panel of claim 14, wherein the plurality of first electrodes receive via the plurality of sensor lines a sensor driving signal for sensing a touch on the mirror display panel.

16. The mirror display panel of claim 14, further comprising:
a polarizing film attached to the first substrate.

17. The mirror display panel of claim 14, wherein the plurality of first electrodes and the plurality of second electrodes of the mirror panel are divided into a plurality of blocks having a predetermined size.

18. The mirror display panel of claim 17, wherein each of the plurality of first electrodes is overlapped by a corresponding one of the plurality of second electrodes.

19. The mirror display panel of claim 14, wherein the mirror display panel is a liquid crystal panel driven in a normally white mode.

* * * * *